United States Patent [19]
Woodward

[11] 3,854,194
[45] Dec. 17, 1974

[54] LIQUID INTERFACE DIFFUSION METHOD OF BONDING TITANIUM AND/OR TITANIUM ALLOY STRUCTURE AND PRODUCT USING NICKEL-COPPER, SILVER BRIDGING MATERIAL

[75] Inventor: James R. Woodward, El Cajon, Calif.

[73] Assignee: Rohr Industries, Inc., Chula Vista, Calif.

[22] Filed: Aug. 16, 1973

[21] Appl. No.: 388,739

Related U.S. Application Data

[63] Continuation-in-part of Ser. No. 99,061, Dec. 17, 1970, abandoned, which is a continuation-in-part of Ser. No. 765,156, Oct. 4, 1968, abandoned.

[52] U.S. Cl.............. 29/494, 29/472.3, 29/498, 29/502, 29/504, 29/198
[51] Int. Cl...................... B23k 31/02, B23k 35/38
[58] Field of Search ....... 29/471.1, 472.1, 498, 502, 29/504, 198, 494, 472.3

[56] References Cited
UNITED STATES PATENTS

| | | | |
|---|---|---|---|
| 2,906,008 | 9/1959 | Boegehold et al. | 29/498 X |
| 3,222,775 | 12/1965 | Whitney | 29/498 X |
| 3,365,787 | 1/1968 | Forsberg et al. | 29/471.1 |
| 3,369,288 | 2/1968 | Holman | 29/502 X |
| 3,417,461 | 12/1968 | Wells et al. | 29/504 X |
| 3,442,010 | 5/1969 | Albers | 29/198 X |
| 3,455,663 | 7/1969 | Zdanuk | 29/198 X |
| 3,466,737 | 9/1969 | Hanink | 29/502 X |
| 3,561,099 | 2/1971 | Mizuhara | 29/198 X |
| 3,581,382 | 6/1971 | Wells et al. | 29/502 X |
| 3,626,582 | 12/1971 | Melill | 29/472.1 X |

*Primary Examiner*—Andrew R. Juhasz
*Assistant Examiner*—Ronald J. Shore
*Attorney, Agent, or Firm*—Patrick J. Schlesinger

[57] ABSTRACT

A liquid interface diffusion process for bonding titanium or titanium alloys wherein at least one of the titanium type materials to be fayed is sequentially plated with a total weight of from between 1 and 5 gms/ft$^2$ of honeycomb core of layers of nickel, copper, silver, copper and nickel or an alloy made therefrom. The faying surfaces are then held together to maintain position on alignment, placed in a protective atmosphere, the temperature of the materials are then raised at a controlled rate causing sufficient solid state diffusion to occur and a liquid to form continuing to increase the temperatures to a predetermined level and holding at this temperature until a solidification occurs and a sufficient additional solid state diffusion occurs producing a desirable dilution of bridge material and titanium at the joint, and then reducing the temperature at a controlled rate to a lower temperature to complete the bonding cycle.

24 Claims, 5 Drawing Figures

PATENTED DEC 17 1974　　3,854,194

LIQUID INTERFACE DIFFUSION METHOD OF BONDING TITANIUM AND/OR TITANIUM ALLOY STRUCTURE AND PRODUCT USING NICKEL-COPPER, SILVER BRIDGING MATERIAL

BACKGROUND OF THE INVENTION

This is a continuation in part of pending application Ser. No. 99,061. filed Dec. 17, 1970, which is a continuation in part of pending application Ser. No. 765,156, filed Oct. 4, 1968 for "Combined Brazing-Diffusion Method of Bonding Metallic Honeycomb Sandwich Panel Structure," both by the applicant hereof, and assigned to the same assignee as the present application, both applications now abandoned.

This invention relates generally to liquid interface diffusion bonding of titanium and titanium alloy materials and, more specifically, to honeycomb core sandwich panels in which liquid solid state diffusion is utilized to establish a physical bond between the faying surfaces of joined materials.

Brazing and diffusion bonding methods for the joining of honeycomb sandwich panel structures have hereinbefore been known and separately used with some degree of success but have not been found to be entirely satisfactory in service for reasons hereinafter set forth.

The brazing method requires fusion of a filler metal or alloy which upon becoming molten flows by capillary action into the ever present voids along the faying surfaces of the base metal parts to be joined. There is no fusion of the base metal itself. The brazing process thus adds another filler metal, or metals, to the basic metal system to effect a joint therebetween. This added metal not only often flows to surface areas other than those required to effect the brazed joint but also significantly adds to the weight of the bonded structure. For example, an added weight of 50 to 120 grams per square foot of honeycomb sandwich panel using 2 mls. brazing alloy foil is common.

Filler metals which do not rapidly diffuse into the base metal are considered to be non-reactive; those which rapidly diffuse into the base metal being considered reactive. The filler metal or alloy has a melting point much lower than that of the base metal of the parts being joined, and these lower melting fillers often react with the base metal with resultant degradation of its properties. Titanium, for example, is difficult to braze because it is highly reactive with most filler metals. In many cases those filler metals which do not significantly effect the base metal properties do not have the characteristics required to fully utilize design properties such as corrosion resistance, high temperature strength, and toughness, which properties are normally obtained from mechanisms formed of the basis metals.

Diffusion bonding generally describes a solid state joining process in which no fusion is involved, no deleterious foreign material is added, and the joint is made only by self diffusion or solid state reactions of the component materials under conditions of cleanliness, temperature and pressure. The metal to metal contact under very high pressure is essential to the process and is provided by plastic deformation of the components, usually effected by creep. After the contact is made under ultraclean conditions, solid state diffusion takes place. The problem of establishing metal to metal contact under the ultraclean requirements is significant. To obtain contact by creep, however, requires time while cleanliness degrades with time. Establishing metal to metal contact by yield or plastic flow is often impractical, especially when applied to honeycomb sandwich panel structures.

SUMMARY OF THE INVENTION

In accordance with the present invention, a comnbined liquid and solid state diffusion process for bonding of titanium and titanium alloy structures is provided which substantially obviates the problems of the prior art diffusion bonding processes while retaining the advantages thereof. Specifically, a small amount of nickel, copper and silver is interposed between the faying edges of the materials to be bonded, to form a diffusion bridge. The interposed metals are deposited as layers of Ni, Cu, Ag, Cu and Ni in that order or as an alloy of these metals. The materials are then heated in a protective atmosphere from ambient temperatures to a higher temperature wherein the solid state diffusion occurring while heating forms a eutectic composition which will become liquidus for a short time period at a temperature lower than the melting point and beta transus of any of the metals involved in the process. The temperature is increased at a controlled rate to a predetermined level and is held sufficiently long to cause the eutectic melt to again solidify and further dilute by solid state diffusion the bridge metals and titanium to enable the formation of a predetermined alloy at the point of bonding. The heating source is then removed and the temperature is lowered by a predetermined cooling period to ambient while maintaining the protective atmosphere.

Interposition of the bridge materials between the faying surfaces to be bonded preferably is accomplished by placement of a thin layer of the selected metals or alloy on the edges of the honeycomb core in laminar form. This placement may be accomplished by any suitable means such as by brush (Dalic) or dip electroplating, vapor deposition and powder flame spray, of which dip electroplating is preferred and provides control of the volume and placement of the plated materials.

The primary purpose of this bridge is to establish a metal to metal contact and resultant diffusion bridge between the faying surfaces so that atomic transport is effected and the post solid state diffusion is accelerated whereby a stabilized diffusion bonded joint is achieved rapidly and minute fillets are also formed to augment the properties of the joined structure such as fatigue, shear and flatwise tensile strength.

Various known means may be employed to fixture the assembly of components preparatory to bonding of the same by the combined liquid interface diffusion process of the present invention.

Various known means may be employed to apply the heat of which heating in a hard vacuum is preferred.

Effective cleaning of the titanium is an important phase of the overall plating and liquid interface diffusion bonding of the honeycomb core-sandwich panel structures to prevent contamination of the titanium.

OBJECTS OF THE INVENTION

An object of the present invention is to provide a new and improved method of forming a stabilized diffusion bonding joint between two members, each of which is formed of titanium or a titanium based alloy.

Another object is to provide a bonded joint between two members, each of which is formed of titanium or a titanium based alloy which in the forming thereof combines desirable features of both liquid and solid state diffusion bonding methods.

Still another object is to provide a process of producing a liquid interface at the faying surfaces of titanium and titanium based parts to be diffusion bonded to develop a diffusion bridge and accelerated atomic diffusion therebetween without impairing the properties of the basis materials of the joined parts or adding appreciably to the weight thereof.

A further object is to provide a combined liquid and solid state diffusion bonding method for joining the core and facing sheets of metallic honeycomb sandwich panel structures of titanium and titanium based alloys.

Still a further object is to ruduce overall weight addition when bonding titanium core to facing sheets or solid sections solid sections.

Still a further object is to provide a liquid interface and solid state diffusion bonding process and resultant joined structure characterized by grain formation of the basis materials across the bonded joint and dilution of the brazing materials within the region of the joint.

Yet another object in a combined liquid interface diffusion bonding process and resultant joint is to control the amount and placement of the laminations of the bridge metals.

Still other objects, features and advantages of the present invention will become more fully apparent as the description proceeds, reference being had to the accompanying drawings wherein:

The present invention relates to bonding of titanium and titanium alloy material, preferably honeycomb.

Figure 1:
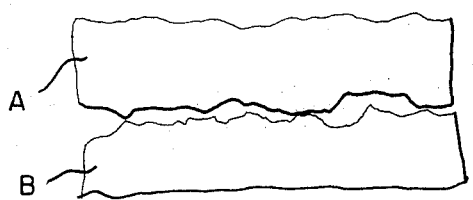
FIG. 1 is a micrographic showing of the true surface condition of real parts.

Reference is now directed to the drawings, and first more particularly to FIG. 1, for a more complete understanding of the invention.

The parts A and B to be bonded are neither perfectly flat nor clean as shown in FIG. 1, wherein micrographic portions of parts A and B are shown at many times magnification. In order to achieve diffusion bonding as represented at the interface of A and B it is necessary to establish an ultraclean condition of the parts, and to employ high pressure and temperature for extended periods of time without causing a gross deformation and degradation of mechanical properties which might result from use of excessive time, temperature, or pressure.

According to prior art methods, self diffusion bonding may be accomplished by either being yield-stress controlled, that is utilizing pressures which exceed the material strength at bonding temperature or creep controlled in that extended time is required to establish metal to metal contact across the interfacial voids before atomic diffusion can begin. The yield method of plastic flow requires ultraclean surface conditions, but because of the relatively short exposure times and high pressure engagement of the parts, the bonded parts are less subject to physical property damage due to the presence of atmospheric impurities. The slow creep controlled processes, by contrast, are critical with respect to surface cleanliness and also require a protective atmosphere or hard vacuum to prevent contamination and loss of properties. Both methods employ plastic flow of the components to be joined. The yield stress controlled method requires relatively short periods of time at temperature and therefore is a preferred method but requires high pressures and very clean conditions at temperatures in the 170°F range. The yield stress controlled method requires large expenditures for machinery to apply high forces to the parts being joined while they are at a high temperature. This also requires that such machinery be devoid of contaminants. The creep controlled process requires extremely long periods of time to provide plastic flow to obtain atomic contact of the components. During the long period of time at high temperature the titanium picks up oxygen and other contaminates making this process even less desirable.

Figure 2:
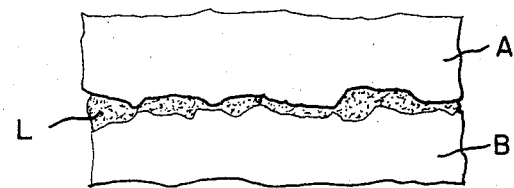
FIG. 2 is a graphical showing of the liquid interface and diffusion bridge at the faying surfaces of parts to be bonded in accordance with the process of the present invention.
Figure 3:
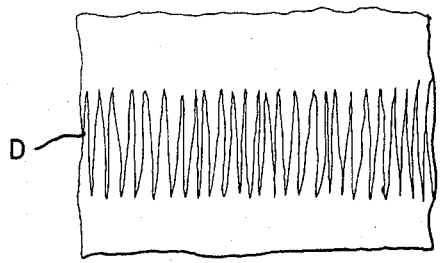
FIG. 3 is a graphical representation of atom transport of the basis materials effected by the diffusion bridge and additionally showing dilution of the bridge materials.

FIGS. 2 and 3 graphically represent features and resultant effects characteristic of the liquid interface-diffusion bonding process of the present invention and the bonded joint produced thereby.

In FIG. 2 the region L represents the bridge material after it has turned liquid and shortly after it has then become solid which takes place by the placement of a small amount of bridging material on the engaging surface of at least one of the parts A or B to be bonded and heating the parts and interposed bridging material to at least the eutectic temperature. It is noted that the voids shown in Figure 1 have been filled when the bridge material became liquid.

This temperature is raised above about 1600°F and preferably 1700 to 1750°F but in any event below the beta transus of the titanium alloy for a period of time sufficient to cause the eutectic alloy to again solidify and continue the solid state diffusion as depicted at D in FIG. 3.

Figure 4:
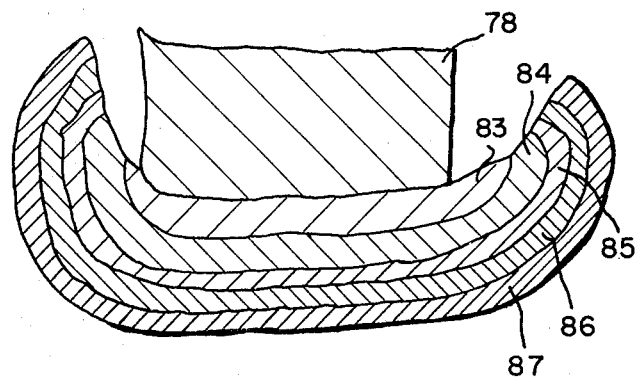
FIG. 4 is a greatly enlarged, fragmentary, sectional micrograph of an edge portion of a honeycomb core member showing successive platings of different metals in a preferred sequence for forming the liquid interface on at least one of the faying surfaces to be joined by means of the present invention.

A preferred sequence for the depositing of the bridge materials for practicing the invention is shown in FIG. 4 which is a drawing of a greatly enlarged micrograph of the edge portion of titanium core material with the successive platings thereon. These platings comprise in sequence by layers 83 Ni, 84 Cu, 85 Ag, 86 Cu and 87 Ni. The proportionate total amounts of the plating metals are Ni 38 to 45 percent, Cu 38 to 45 percent and Ag 10 to 24 percent. A preferred set of percentages for the layers is 83 Ni 21 percent, 84 Cu 21 percent, 85 Ag 16 percent, 86 Cu 21 percent and 87 Ni 21 percent.

The total thickness of the interface plating preferably should be no greater than is required for sufficient diffusion with the basis material to form a good bonding composition of from 88 to 100 percent titanium or base alloy composition at the joint. For bonding honeycomb to a sheet, from between 1 to 5 grams per square foot of honeycomb core of the bridge material is required. For bonding a sheet to a sheet, from 6 to 12 grams of bridge material is required per square foot of faying surface.

Figure 5:
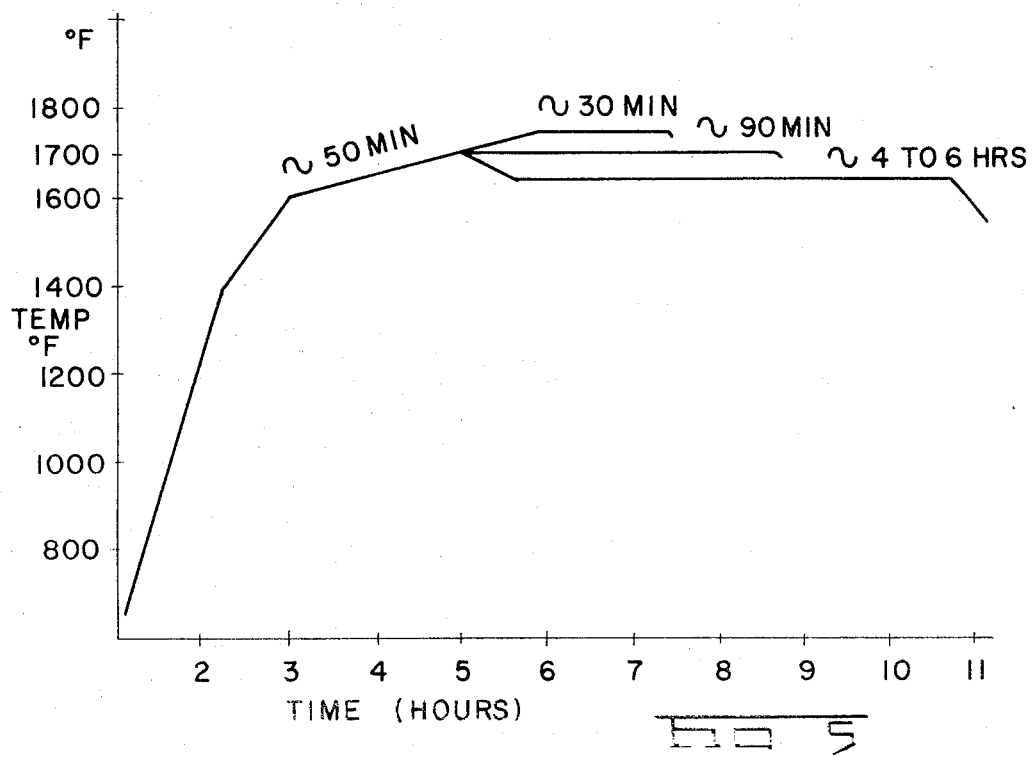
FIG. 5 is a graph showing a typical bonding cycle obtained in the practice of the combined liquid interface diffusion bonding process of the present invention.

Upon assembly of the panel parts and fixturing, the same are placed in a protective atmosphere for heating. The heating cycle depends upon the part geometry and mass configuration. The rate of heat is dependent upon the thermal gradients within the tooling and part system. It is conventionally practiced to keep thermal gradients to a relatively low figure. As shown in FIG. 5, the temperature in the furnace is increased at a rate of about 100°F per minute to about 1400°F at which time the thermal gradients should be brought to about 50°F or less. Therefore the rate of heating is now decreased until the thermal gradients are closed to less than 20°F when the parts reach 1600°F. A temperature rate increase from 1400°F to 1600°F of about 20°F per minute has been found acceptable. During this period, the copper and silver portions of the bridge material react to form a mush of liquid and solid, thereby accelerating the diffusiom potential of the bridge materials and titanium at higher temperatures.

At 1600°F the rate of heating is lowered to about 2°F per minute to control thermal gradients and to allow time for diffusion of the bridge materials. The temperature is increased at this rate in the range of 1700° to 1750°F. During this time, the titanium, copper and nickel eutectic composition is reached by diffusion and the eutectic liquid is formed whereby the liquid or melt completely fills the ever present voids between the surfaces being bonded and produces a minute fillet. The time of liquid formation is short because the continuing diffusion of titanium quickly change the composition of the melt from the eutectic composition to an enriched titanium composition. This causes isothermal solidification. The bonded structure is maintained at the elevated temperature to allow for maximum diffusion of the bridge materials away from the joint. As can be observed from FIG. 5, the length of time for diffusion of the bridge materials away from the joint is temperature dependent. A temperature of 1700°F for 90 minutes is preferred, it being understood that greater time periods provide even more diffusion of the bridge materials away from the joint. It is also apparent that higher temperatures provide more rapid diffusion, however such higher temperatures enhance the risk of exceeding the beta transus of the titanium alloy.

The cooling cycle is now performed, this being dependent upon thermal gradients which can cause undesirable residual stresses within the part. Therefore it is common practice to cool as rapidly as possible without the development of severe thermal gradients which could cause warpage and thermal stresses. A cooling rate of less than 50°F per minute to a temperature of 1200°F is necessary, at which time the cooling rate can be increased to up to 100°F per minute. At the start of the cylcle, the hard vacuum employed is of the order of $10^{-5}$ Torr and increases to and mtaintains a constant level of about $10^{-6}$ Torr during the secondary diffusion phase and controlled cool down phase. After 1000°F or less is obtained the system may be vented to an inert atmosphere if desired to accelerate cooling. The part is not exposed to ambient air until it is below 300°F.

The invention provides a method for the diffusion bonding of titanium which obviates the necessity for distortion of the basis metals by either creep or yield stress, and which can be accomplished at less cost and in less time than has heretofore been possible.

This invention may be embodied in other forms or carried out in other ways without departing from the spirit or essential characteristics thereof. The present embodiments and examples of the invention are therefore to be considered as in all respects illustrative and not restrictive, the scope of the invention being indicated by the appended claims, and all changes which come within the meaning and range of equivalency of the claims are intended to be embraced therein.

Having thus described the invention, what is claimed as new and useful and desired to be secured by U.S. Letters Patent is:

1. The liquid interface diffusion method of bonding honeycomb core material to its facing sheets where said core and face sheets are made of titanium or titanium based alloy material which comprises the steps of:

depositing on the core edge surface sequentially as a laminate thereon layers of at least three metals to form a diffusion bridge material;

placing together the faying surfaces to be bonded with said bridge material therebetween;

subjecting said faying surfaces to sufficient positive pressure to maintain position and alignment for joining; and while the faying surfaces are being so held in a protective atmosphere, raising the temperature of the same to first cause an atomic diffusion to take place within the laminate of said bridge material and between said bridge material and the titanium, secondly to cause a melt of the eutectic alloy formed by said diffusion, and thirdly to maintain the temperature at a predetermined level above said melt level for a predetermined period of time after the eutectic melt solidifies to thereby dilute said bridge material and titanium in the region of the bond by solid state diffusion therebetween, said three metals of the laminate being nickel, copper and silver, said nickel and copper layers of the laminate being equal and consisting of from 76 to 90 percent of the total weight of the laminate.

2. A method as set forth in claim 1 wherein the center layer of the laminate is silver and is from 10 to 24 percent of the total weight of the laminate.

3. A method as set forth in claim 1 wherein said laminate is arranged in layers of nickel, copper, silver, copper and nickel, in that order.

4. A method as set forth in claim 2 wherein said laminate is arranged in layers of nickel, copper, silver, copper and nickel, in that order.

5. A method as set forth in claim 3 wherein substantially one half of said copper is in each of said layers of copper and one half of said nickel is in each of said layers of nickel.

6. A method as set forth in claim 4 wherein substantially one half of said copper is in each of said layers of copper and one half of said nickel is in each of said layers of nickel.

7. A method as set forth in claim 1 wherein the weight of said laminate is from about 1 to about 5 grams per square foot of honeycomb core.

8. A method as set forth in claim 2 wherein the weight of said laminate is from about 1 to about 5 grams per square foot of honeycomb core.

9. A method as set forth in claim 3 wherein the weight of said laminate is from about 1 to about 5 grams per square foot of honeycomb core.

10. A method as set forth in claim 4 wherein the weight of said laminate is from about 1 to about 5 grams per square foot of honeycomb core.

11. A method as set forth in claim 5 wherein the weight of said laminate is from about 1 to about 5 grams per square foot of honeycomb core.

12. A method as set forth in claim 6 wherein the weight of said laminate is from about 1 to about 5 grams per square foot of honeycomb core.

13. A method as set forth in claim 6 wherein said layers of nickel and copper are each 21 percent of the total weight of said laminate and said silver is 16 percent of the total weight of said laminate.

14. A method as set forth in claim 12 wherein said layers of nickel and copper are each 21 percent of the total weight of said laminate and said silver is 16 percent of the total weight of said laminate.

15. A method as set forth in claim 1 wherein said bridge material at the interface of said surfaces is less than 12 percent by weight of the material at said interface.

16. A method as set forth in claim 3 wherein said bridge material at the interface of said surfaces is less than 12 percent by weight of the material at said interface.

17. A method as set forth in claim 5 wherein said bridge material at the interface of said surfaces is less than 12 percent by weight of the material at said interface.

18. The liquid interface diffusion method of bonding facing sheets where said facing sheets are made of titanium or titanium based alloy material which comprises the steps of:

depositing on one sheet surface sequentially as a laminate thereon layers of at least three metals to form a diffusion bridge material;

placing together the faying surfaces to be bonded with said bridge material therebetween;

subjecting said faying surfaces to sufficient positive pressure to maintain position and alignment for joining; and while the faying surfaces are being so held in a protective atmosphere, raising the temperature of the same to first cause an atomic diffusion to take place within the laminate of said bridge material and between said bridge material and the titanium, secondly to cause a melt of the eutectic alloy formed by said diffusion, and thirdly to maintain the temperature at a predetermined level above said melt level for a predetermined period of time after the eutectic melt solidifies to thereby dilute said bridge material and titanium in the region of the bond by solid state diffusion therebetween, said three metals of the laminate being nickel, copper and silver, said nickel and copper layers of the laminate being equal and consisting of from 76 to 90 percent of the total weight of the laminate.

19. A method as set forth in claim 18 wherein said laminate is arranged in layers of nickel, copper, silver, copper and nickel, in that order.

20. A method as set forth in claim 19 wherein substantially one half of said copper is in each of said layers of copper and one half of said nickel is in each of said layers of nickel.

21. A method as set forth in claim 20 wherein the weight of said laminate is about 6 to about 12 grams per square foot of faying surface.

22. A method as set forth in claim 1, wherein said protective atmosphere is in the range of about $10^{-5}$ to $10^{-6}$ Torr, wherein said temperature is raised at a temperature of about 100°F. per minute to about 1400°F, then at a rate of about 20°F. per minute to about 1600°F. and then at a rate of about 2°F. per minute to about 1700° to 1750°F.

23. A method as set forth in claim 12, wherein said protective atmosphere is in the range of about $10^{-5}$ to $10^{-6}$ Torr, wherein said temperature is raised at a temperature of about 100°F. per minute to about 1400°F, then at a rate of about 20°F. per minute to about 1600°F. and then at a rate of about 2°F. per minute to about 1700° to 1750°F.

24. A method as set forth in claim 18, wherein said protective atmosphere is in the range of about $10^{-5}$ to $10^{-6}$ Torr, wherein said temperature is raised at a temperature of about 100°F. per minute to about 1400°F, then at a rate of about 20°F. per minute to about 1600°F. and then at a rate of about 2°F. per minute to about 1700° to 1750°F.

* * * * *